Patented Nov. 17, 1936

2,060,926

UNITED STATES PATENT OFFICE 2,060,926

EGG TREATMENT PROCESS AND PRODUCT

Faw Yap Chuck, San Francisco, Calif.

No Drawing. Application February 3, 1936,
Serial No. 62,046

19 Claims. (Cl. 99—170)

This invention relates generally to processes for the treatment of eggs to effect their preservation, and to products of manufacture resulting from such processes. Certain features of the invention disclosed herein may be deemed an improvement of the invention disclosed and claimed in my co-pending application Serial Number 730,071, filed June 11, 1934.

In my aforesaid co-pending application I have disclosed an egg treatment process making use of a coating material containing a dissolved alkaline earth compound capable of ready conversion by carbon dioxide to form a substantially insoluble alkaline earth carbonate. The material in that instance is in the form of an emulsion of a water solution and mineral oil, a suitable alkaline earth compound being calcium hydroxide. For converting the calcium hydroxide or like compound to calcium carbonate, I rely in that instance upon carbon dioxide from the surrounding atmosphere and carbon dioxide evolved from the interior of the egg.

It is an object of the present invention to provide a superior process for egg treatment, and a superior product resulting from the process. Instead of relying upon carbon dioxide from the atmosphere, or carbon dioxide evolved from the interior of the egg, to convert the dissolved calcium compound to calcium carbonate, I now provide a positive chemical treatment for this purpose, which rapidly carbonates the calcium compound. Thus no extended period of time is required to provide a coating of the desired character. I also provide ingredients in the coating material tending to promote better preservation of the eggs, and ingredients serving to form a buffer salt system in the final coating. Likewise an ingredient or ingredients are provided which serve to increase the carbon dioxide tension on the surface of the egg, whereby the contents of the egg are more effectively preserved. The coating produced by the present invention is also superior with respect to its physical characteristics, in that it is more firmly bonded to the surface of the egg shell, and affords a more attractive appearance.

Further objects of the invention will appear from the following description in which the preferred embodiments of the invention have been set forth in detail.

The process consists generally in first applying a primary liquid coating material to the exterior surface of the egg, which contains a dissolved alkaline earth compound capable of ready conversion to form the desired alkaline earth carbonate. Immediately following application of this coating material, a secondary liquid is applied, which contains an $HCO_3$ radical, to combine with the alkaline earth compound to form a substantially insoluble alkaline earth carbonate, and to leave an excess of the bicarbonate.

In its simplest form, the primary coating material may consist of a saturated solution of calcium lactate in water, emulsified with a neutral mineral oil, like "white" oil. The secondary treatment liquid can consist of a water solution of sodium or potassium bicarbonate, likewise emulsified with mineral oil by the use of an emulsifying agent like a calcium soap. Assuming that the surface of an egg has first been coated by use of the primary coating material, application of the secondary solution causes a reaction between the calcium lactate remaining upon the surface of the egg, and the $HCO_3$ radical of the bicarbonate solution, to form substantially insoluble calcium carbonate, and sodium or potassium lactate. The first coating material need not be an emulsion, but may merely consist of a saturated solution of calcium lactate, with reliance upon the mineral oil of the secondary liquid, to supply an oil film. Likewise if the primary coating material is an emulsion, the second coating material may be a simple water solution.

A third possible modification is to employ a simple water solution of calcium lactate for the first application, and a simple solution of sodium or potassium bicarbonate for the secondary treatment. In a third operation, a supplemental treatment liquid is applied. The supplemental liquid in such event should contain a binder, like casein, and preferably a substance like sodium silicate which will enhance the desired chalky appearance and surface texture, and which will also serve as a preservative. For example the supplemental liquid can consist of 5% by weight of casein dissolved in one part of commercial sodium silicate, together with four parts of water. Reaction of this supplemental solution with lactate and excess bicarbonate causes the casein to be precipitated to serve as a binder for the final coating.

It is desirable to employ the sodium or potassium carbonate in the secondary solution, in concentrations sufficient to afford an excess of unconverted carbonate in the final coating. The effect of such a coating in the preservation of the egg, is similar to maintaining an egg in an atmosphere of carbon dioxide gas. Metabolism of the egg content is accompanied by evolution of carbon dioxide gas through the pores of the shell. Placing an egg in a chamber containing carbon dioxide retards the rate of metabolism, by increasing the carbon dioxide tension about the egg whereby evolution of carbon dioxide is minimized. Bicarbonate on the egg shell makes possible a comparable effect, in increasing the tension of carbon dioxide.

While the above procedures will give good results, I prefer to utilize more complicated solutions which have been found to be more effective. Thus in place of a simple saturated solution of a calcium compound in water, I utilize a less alkaline solution containing several calcium salts, as for example one containing calcium lactate, calcium chloride and a calcium acetate. As an example of suitable proportions, 10 grams of calcium lactate, 22 grams of calcium chloride and 10 grams of calcium acetate, can be employed for each 100 cc. of water. Assuming that this primary treatment liquid is to be emulsified with mineral oil, about 2 grams of gum arabic or ⅓ gram of tragacanth can be added, and about 400 cc. of this solution emulsified with about 600 cc. of mineral oil, using about ½ gram of a calcium soap like calcium stearate, as emulsifying agent. A sufficient amount of a mild organic acid, such as lactic acid, is added to this material to adjust its hydrogen ion concentration to about 6.5, that is, slightly acid to phenol-phthalein indicator. In place of calcium acetate, a similar amount of calcium gluconate can be employed.

A preferred secondary treatment liquid, to be applied to the egg following the application of the coating material described above, can consist of sodium bicarbonate, potassium bicarbonate, sodium benzoate and sodium phosphate, dissolved in water. As an example of suitable proportions, 16 grams of sodium bicarbonate, 20 grams of potassium bicarbonate, 2 grams of sodium benzoate, and 9 grams of sodium phosphate, can be employed for each 100 cc. of water. This carbonating solution can likewise be emulsified with a mineral oil, by the aid of a calcium soap, suitable proportions being about 600 cc. of the solution with about 400 cc. of mineral oil.

Use of the several calcium salts, including calcium lactate, calcium chloride, and calcium acetate, for the primary coating material, makes it possible to provide a relatively large content of dissolved calcium in the applied coating. Assuming that an egg is first coated by use of the preferred primary treatment liquid specified, containing calcium lactate, and other calcium salts, the subsequent application of the preferred secondary liquid specified, causes a reaction to occur between the calcium salts and the bicarbonate salts, in which a major part of the calcium lactate is converted to calcium carbonate, with simultaneous formation of sodium and potassium lactate. Likewise calcium carbonate is formed by conversion of the calcium chloride and calcium acetate or gluconate salts, with simultaneous formation of sodium and potassium chlorides and acetates or gluconates. Additional lactates are formed by reaction between the sodium and potassium bicarbonates, and the lactic acid. The calcium carbonate formed is particularly desirable, in that it aids in sealing the pores of the egg shell. Certain by-products of the reaction, such as sodium and potassium lactates and chlorides, serve desirable functions in the completed coating, in that they have a pronounced preserving action. A sufficient amount of unreacted sodium and potassium bicarbonates remain incorporated in the coating to afford an increased carbon dioxide tension, as previously described.

The sodium phosphate of the carbonating solution is not altered to any material degree, but its presence on the surface of the egg supplements other salts present, particularly the sodium and potassium lactates and bicarbonates, to provide a buffer salt system. This buffer salt system is desirable in that when moisture from the atmosphere is deposited upon the surface of the egg, as during cold storage, a buffer salt solution is formed having a pH value of about 7.5 to 8. This pH value of the final coating can be adjusted to fall within the limits desired by varying the amount of lactic acid introduced into the primary treatment liquid. The albumen content of the egg normally has a hydrogen ion concentration of from 7.9 to 8, but metabolism tends to shift the pH value to the alkaline side with evolution of $CO_2$. I have found that the presence of such a buffer salt mixture on the surface of the egg shell, together with an increased carbon dioxide tension, definitely tends to minimize a shift in the pH value of the contents of the egg, and therefore retards the metabolism rate, or a change in thick egg white to thin and weakening of the yolk membrane. The benzoate of soda, specified for the carbonating solution, is desirable in that it tends to prevent mold formation.

As previously explained in connection with the simplified treatment liquids first specified, mineral oil can likewise be omitted from the more complex treatment liquids. In such event the supplemental treatment liquid is employed, consisting for example of 5% of casein by weight dissolved in one part of commercial sodium silicate solution, together with four parts of water. The casein content of such a third treatment material is precipitated to serve as a binder, and serves as a substitute for a thin film of mineral oil, while the sodium silicate content enhances the chalky appearance of the treated egg, and provides a desirable surface texture.

With respect to the mechanical procedure followed in applying the materials specified, it is desirable to apply the primary coating material in such a manner as to secure good penetration into the pores of the egg shell, whereby in the final coating the pores of the shell will be effectively plugged. One procedure which has been found beneficial in this respect, is to first heat the eggs by subjecting them to radiant heat, after which they are sprayed with the primary treatment liquid, while the liquid is relatively cool. Such heating serves to expel some gas from the eggs, so that when the eggs are cooled the liquid tends to be sucked into the pores of the shell. As an alternative, or as an adjunct to such treatment, high pressure spraying means can be employed, so that the particles of liquid material are impacted upon the surfaces of the eggs at high velocities. Another alternative is to subject the eggs to a partial vacuum before the liquid is applied. After applying the primary coating material, excess liquid is removed from the surface of the egg by an air blast, after which the eggs are immediately sprayed with the carbonating liquid. Following treatment by the carbonating liquid, excess liquid is again removed by an air blast, and if the supplemental treatment liquid is being employed, this can likewise be sprayed upon the eggs, to be followed by blowing off of excess liquid and drying.

Eggs treated according to the preferred procedures outlined above have desirable keeping qualities both at ordinary atmospheric temperatures, and in cold storage. Loss of weight, over a period of time, is substantially the same as eggs which have been processed by conventional methods, utilizing dipping of eggs in hot mineral oil. However, for eggs stored a given period of time, the condition of the whites and yolks, is markedly superior in quality to eggs processed by conventional methods. I attribute this to the preservatives incorporated in the coating on the egg shell, and to the buffer salt mixture and bicarbonate provided, which definitely retard metabolism and decomposition of the albumen content. The coating is relatively tenacious and firmly bonded to the shell, and because of the chalky appearance and texture afforded, enhances the appearance of the eggs. Whereas conventional processing methods employing mineral oil can be applied only to eggs which have not been sand blasted, my process can be applied equally well to all classes of eggs, whether sand blasted or not.

I claim:

1. In a process for the preservation of eggs, applying a liquid coating material to the surface of the egg, the material containing a dissolved alkaline earth compound capable of ready conversion to form a substantially insoluble alkaline earth carbonate, and then applying a carbonating solution to the exterior of the egg.

2. In a process for the preservation of eggs, applying a liquid coating material to the surface of the egg, the material containing calcium lactate dissolved in water, and then applying a carbonating solution to the egg.

3. In a process for the preservation of eggs, applying a liquid coating material to the surface of the egg, the material containing an alkaline earth compound capable of ready conversion to form a substantially insoluble alkaline earth carbonate, and then applying to the exterior of the egg a water solution containing a dissolved alkali metal bicarbonate.

4. In a process for the preservation of eggs, applying a liquid coating material to the surface of the egg, the material including calcium lactate dissolved in water, and then applying to the exterior of the egg a water solution containing alkali metal bicarbonate.

5. In a process for the preservation of eggs, applying a liquid coating material to the surface of the egg, the material containing calcium lactate dissolved in water, together with additional dissolved calcium salts capable of ready conversion to form calcium carbonate and then applying to the exterior of the egg a water solution containing a dissolved alkali metal bicarbonate.

6. In a process for the preservation of eggs, applying a liquid coating material to the surface of the egg, the material including a calcium lactate dissolved in water, secondly applying to the exterior of the egg a carbonating solution and then applying to the surface of the egg a water solution containing sodium silicate and casein.

7. In a process for the preservation of eggs, subjecting the surface of the egg to liquid spray material, said material containing a calcium compound dissolved in water and capable of ready conversion to form calcium carbonate, removing excess liquid from the egg by subjecting the same to a blast of air and then spraying the egg with a carbonating liquid whereby the calcium compound from the first coating material is converted to calcium carbonate.

8. As a new article of manufacture, an egg having a supplemental deposit of alkaline earth carbonate integrally bonded to its natural shell and serving to reduce the natural porosity of the shell, together with material capable of affording a bicarbonate ion.

9. As a new article of manufacture, an egg having a supplemental deposit of alkaline earth carbonate integrally bonded to its natural shell and serving to reduce the natural porosity of the shell, together with a lactate.

10. As a new article of manufacture, an egg having a supplemental deposit of alkaline earth carbonate integrally bonded to its natural shell and serving to reduce the natural porosity of the shell, together with an alkali metal lactate and an alkali metal phosphate.

11. As a new article of manufacture, an egg having a supplemental deposit of calcium carbonate integrally bonded to its shell and serving to reduce the natural porosity of the shell, together with an alkali metal lactate, and alkali metal phosphate, and an alkali metal bicarbonate.

12. As a new article of manufacture, an egg having a supplemental deposit containing calcium carbonate and calcium silicate integrally bonded to its shell and serving to reduce the natural porosity of the shell.

13. As a new article of manufacture, an egg having a supplemental deposit of calcium carbonate integrally bonded to its shell and serving to reduce the natural porosity of the shell, together with an alkali metal lactate, an alkali metal phosphate, sodium silicate and precipitated casein as a binder.

14. As a new article of manufacture, an egg having a supplemental deposit of calcium carbonate integrally bonded to its shell and serving to reduce the natural porosity of the shell, together with an alkali metal bicarbonate and other salts capable of affording a pH value of from 7.5 to 8 when moistened.

15. In a process for the preservation of eggs, applying a liquid coating material to the surface of the egg, the material consisting of oil emulsified with a water solution containing an alkaline earth compound capable of ready conversion to form a substantially insoluble alkaline earth carbonate, and then applying to the exterior of the egg a water solution containing a dissolved alkali metal bicarbonate.

16. In a process for the preservation of eggs, applying a liquid coating material to the surface of the egg, the material containing an alkaline earth compound capable of ready conversion to form a substantially insoluble alkaline earth carbonate, and then applying to the exterior of the egg a liquid material consisting of oil emulsified with a water solution of an alkali metal bicarbonate.

17. In a process for the preservation of eggs, applying a liquid coating material to the surface of the egg, the material consisting of oil emulsified with a water solution containing an alkaline earth compound capable of ready conversion to form a substantially alkaline earth carbonate, and then applying to the exterior of the egg a liquid material consisting of oil emulsified with a water solution of an alkali metal bicarbonate.

18. In a process for the preservation of eggs, applying a liquid coating material to the surface of the egg, the material containing calcium lactate dissolved in water and having a pH value of about 6.5, and then applying to the surface of the egg a water solution containing an alkali metal bicarbonate.

19. In a process for the preservation of eggs, applying a slightly acid liquid coating material to the surface of the egg, said material including a dissolved alkaline earth compound capable of ready conversion to form substantially insoluble alkaline earth carbonate, and then applying to the exterior of the egg a water solution containing a soluble alkali metal bicarbonate, together with sodium phosphate.

FAW YAP CHUCK.